United States Patent

[11] 3,609,588

[72] Inventor William B. McKnight
 Somerville, Ala.
[21] Appl. No. 889,021
[22] Filed Dec. 30, 1969
[45] Patented Sept. 28, 1971
[73] Assignee The United States of America as
 represented by the Secretary of the Army

[54] REPETITIVELY PULSED HIGH PEAK POWER LASER
 2 Claims, 3 Drawing Figs.
[52] U.S. Cl. .................................................. 331/94.5,
 219/121 L
[51] Int. Cl. .................................................. H01s 3/11
[50] Field of Search ........................................ 331/94.5;
 219/121 L

[56] References Cited
 UNITED STATES PATENTS
 1,455,795 5/1923 Logan .......................... 350/275 X
 3,315,177 4/1967 Benson ........................ 331/94.5
 3,434,073 3/1969 Forkner ....................... 331/94.5
 3,466,566 9/1969 Patel ........................... 331/94.5
 OTHER REFERENCES
 1) Benson et al., " New Laser Technique for Ranging Application," Northeast Electronics Research & Engineering Meeting (NEREM) Record, Session 3, 1962, pp. 34– 35.
 2) Michon et al., " Influence of the 41 11/2 Level Lifetime in a Q-Spoiled Neodymum Doped Glass Laser," Physics Letters, 19, (3) 15 Oct. 1965, pp. 219– 20.
 3) McKnight, " Excitation Mechanism in Pulsed $CO_2$ Lasers," J. Applied Physics, Vol. 40, No. 7, June 1969, pp. 2810– 16.

*Primary Examiner*—Ronald L. Wibert
*Assistant Examiner*—R. J. Webster
*Attorneys*—Harry M. Saragovitz, Edward J. Kelly, Herbert Berl and Harold W. Hilton ABSTRACT: A high peak power laser is repetitively pulsed by a delay circuit that is synchronized with a Q-switching circuit to provide maximum power output pulses. The laser medium has a fixed reflective mirror at one end of the cavity and a partially reflective output mirror rotating on a shaft at the other end thereof. A hole drilled through the diameter of the shaft has a light source and a photocell at opposite ends thereof. Light passes through the hole and activates the photocell once during each half cycle of shaft rotation. In response to the periodic light beam, the photocell produces an electrical pulse which is coupled to a variable delay circuit. The delay circuit triggers a laser pumping circuit, which discharges a large current through the laser medium, stimulating lasing action therein. The rotating shaft brings the output mirror into perpendicular alignment with the laser cavity and in parallel with the fixed mirror, thereby Q-switching the laser from a non-resonant mode into resonance to discharge a large energy pulse therethrough. By introducing the delay network between the periodic light reference pulse and the signal initiating the electrical discharge pulse through the laser, the delay time between the discharge current and alignment of the rotating mirror can be selected so that the laser output pulses can be varied, occuring after the electrical excitation pulses.

PATENTED SEP 28 1971 3,609,588

William B. McKnight,
INVENTOR

Harry M. Saragovitz
BY Edward J. Kelly
Herbert Berl
Harold W. Hilton

REPETITIVELY PULSED HIGH PEAK POWER LASER

BACKGROUND OF THE INVENTION

In a laser medium, lasting action requires population inversion giving rise to optical gain and optical feedback which converts the laser amplifier into an oscillator. Population inversion of a homogenous laser material has been obtained by applying pumping energy to the laser medium from an electric power source, as by exciting an electric discharge in a gaseous laser material or by impinging light energy on the laser material.

The carbon dioxide laser, $CO_2$, normally possesses three modes of vibration: a symmetric stretching about the carbon atom along the molecular axis, a bending mode which is doubly degenerate and an asymmetric stretching mode along the molecular axis. Continuous laser action on the vibrational-rotational bands of $Cp_2$ has been enchanced by selective excitation of the upper laser level through collision with excited nitrogen ($N_2$) and helium (He). The high-power, high-efficiency systems have all employed a continuously flowing gas mixture. It has been generally found that sealed systems rapidly decay in output and efficiency. Adding water vapor to the laser gas mixture reduces the system decay but does not halt it completely. One method of increasing the maximum power level and efficiency of a laser is to reduce the cavity Q while stimulating inversion population of appropriate energy levels therein. In this method the upper energy level population is increased and the cavity Q is rapidly increased allowing a high pulse of laser output energy to be obtained. Thus, in Q-switching a laser, the laser is pumped while in a nonresonant state and then switched rapidly into resonance by rotating a prism or mirror or by any one of several other shuttering means.

SUMMARY OF THE INVENTION

The apparatus of the present invention is a laser wherein pumping is obtained by passing an electric discharge through the laser medium while the medium is in a nonresonant state. The laser medium cavity is periodically varied from resonance to nonresonance, the period being readily adjustable. Q-switching the laser cavity from a nonresonant mode into a resonant mode consists essentially of rotating a mirror which forms one end of the laser cavity, and using a reference fixed with respect to the mirror position to initiate a pulsed discharge. By introducing a variable delay between the reference pickoff and a trigger initiating the pumping discharge pulse, the delay time between the discharge current and resonance alignment of the rotating mirror can be selected to that the laser output energy pulse occurs at various times after occurrence of the excitation pulse A unique igniter circuit allows one side of the laser tube to remain at ground potential while providing a ground path of the igniter circuit, thereby allowing a maximum voltage to be developed suddenly across the laser electrodes.

The gain and consequently the inversion of the laser can be probed by sweeping the time delay throughout the time that an inversion of population levels exists. In the absence of stimulated emission, the envelope of the amplitude of the laser pulses derived in this manner is a gain versus time curve. By monitoring the change in the population of either the upper or lower laser level at the time the Q-switched output pulse occurs, the time dependent behavior of the population of both levels are in principle determined.

DESCRIPTION OF THE PREFERRED EMBODIMENT

Figure 1:
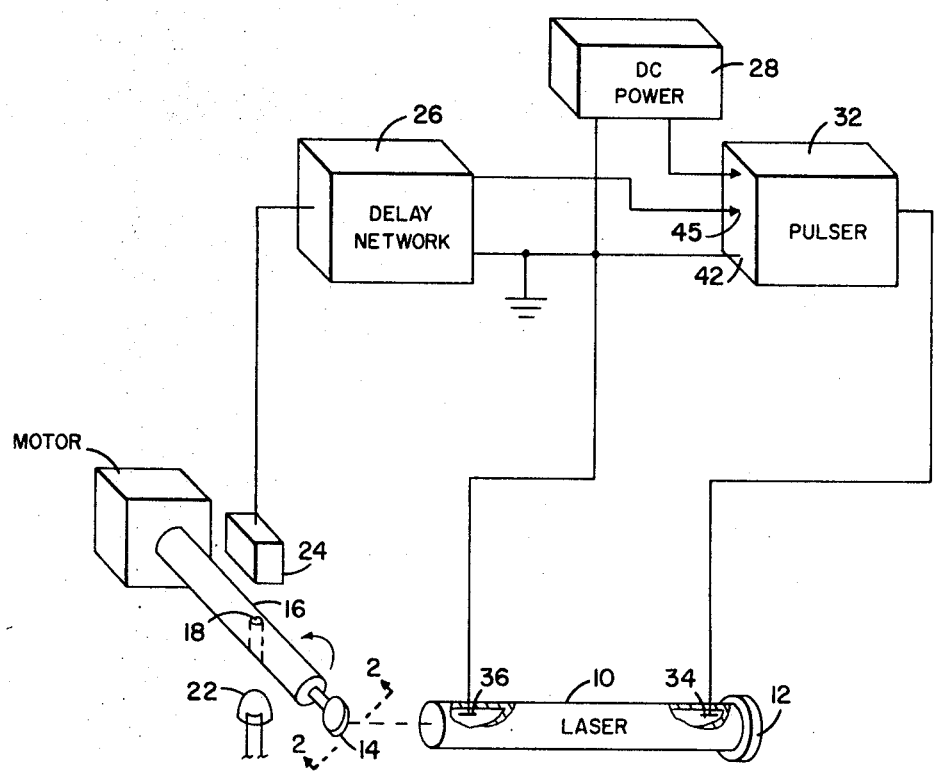
FIG. 1 is a perspective view of a preferred embodiment of the invention.
Figure 2:
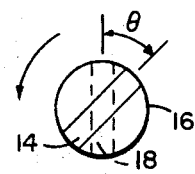
FIG. 2 is a view along the lines 2—2 of FIG. 1.

Referring now to the drawings wherein like numerals represent like parts in all figures, there is disclosed a preferred embodiment of the invention in FIGS. 1 and 2. A laser housing 10 has a fixed mirror 12 at one end thereof and a rotatable mirror 14 adjacent the other end. Mirror 14 is adjustably fixed to the end of a high-speed motor shaft 16. A hole 18 is drilled through the diameter of shaft 16, the longitudinal axes of the hole and the shaft being mutually perpendicular. Mirror 14 is positionable on the end of shaft 16 to form a variable angle $\theta$ between the axis of hole 18 and the plane of mirror 14, the common point between the plane of mirror 14 and the axis of hole 18 being approximately the shaft longitudinal axis.

A lamp 22 and a light-sensitive detector 24, such as a silicon cell, are positioned at opposite sides of shaft 16 in the rotational plane of hole 18. Light detector 24 has an output thereof electrically connected to a delay network 26. A large direct current power source 28 is connected to a pulser circuit 32 for providing laser pumping. Delay network 26 is connected to pulser 32 and provides the trigger impulse thereto to activate the pumping or pulsing circuit. Pulser 32 is connected to a power input electrode 34 and a ground return electrode 36 of laser 10. Laser 10 is a gas laser and the conductive path between electrodes 34 and 36 is completed through the gas therein.

Figure 3:
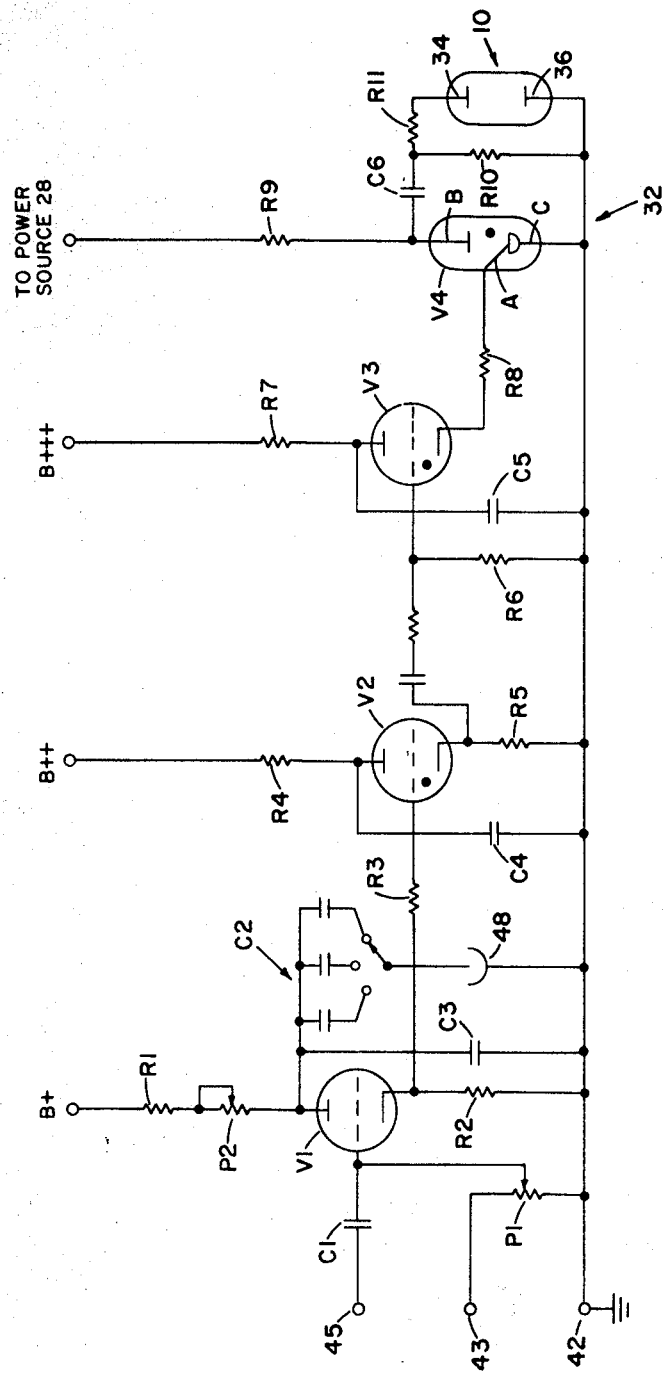
FIG. 3 is a schematic diagram of the pulser of FIG. 1.

FIG. 3 is a schematic of pulser network 32 and laser 10. A terminal 42 is grounded to system ground and is connected to electrode 36 of laser 10. First stage input bias voltage is supplied through a terminal 43 and connected through a potentiometer P1 to ground. a sliding contact of P1 is connected to the grid of a triode V1 supplying bias potential thereto. The grid of V1 is further connected through a coupling capacitor C1 to a signal input terminal 45 through which the delayed trigger signal is received from delay network 26. The plate of V1 is connected through an adjustable resistance P2 and a seriesed resistor R1 to a power source B+. A variable capacitance C2 has one side thereof connected to the plate of V1 and the other side connected through a signal monitor 48 to system ground. A capacitor is further connected between the plate of V1 and ground, bypassing monitor 48. The cathode of V1 is resistively coupled to ground through resistance R1 and is also coupled through a resistance R3 to the grid of a thyratron V2. The plate of V2 is connected through a load resistor R4 to a power supply and is connected through a plate capacitance C4 to ground. The cathode of V2 is connected to ground through a resistor R5 and is connected through a series connected RC circuit to the grid of a thyratron V3. A grid bias resistor R6 is connected between ground and the grid of V3. Similar to V2, the plate of V3 is connected through a resistor R7 to a power supply and through a capacitor C5 to ground. The cathode of V3 is connected through a resistor R3 to a starter electrode A of an ignitron or electronic switch V4. An electrode B of V4 is connected to one side of a capacitor C6 and through a large resistance R9 to the laser power source 28. The other side of capacitor C6 is connected through a resistor R10 to ground and through a resistor R11 to laser electrode 34. An electrode C of electronic switch V4 is connected to ground. The power supplies for each of the tubes may be separate potentials tapped from source 28 or can be supplied from a separate source or sources, while utilizing a common ground.

In a typical system laser tube 10 is a 2-inch diameter, 96-inch-long glass tube fitted with aluminum sections at each end thereof having stainless steel adjustable mirror mounts attached thereto. A gas intake attached to one of the aluminum end pieces connects to a gas-mixing manifold. Gas supplied in standard cylinders are attached through metered needle valves to monitor the gas mixture supplied to the laser tube. The flow rates of individual constituents, $CO_2$, $N_2$ and He, are monitored by flowmeters if it is desired to operate the system in a continuous flow manner. For nonflowing operation, inlet and outlet valves allow the tube 10 to be sealed off. A pump is connected to the other aluminum end to draw the gases uniformly through the tube prior to sealed-off operation. The metal end fittings are used as the electrodes 34 and 36, with the outlet end (electrode 36) grounded. Typically, the ends of the laser tube can be closed with a germanium flat or a rock salt flat and the output mirror can be a flat, gold-coated mirror with a center hole.

Mirrors 12 and 14, axially aligned at opposite ends of laser tube 10, form an optical cavity therebetween when rotatable mirror 14 rotates into a plane parallel with the plane of mirror 12. The optical cavity is thus formed once during each half cycle of revolution of mirror 14. Mirror 14 is the Q-switch mirror, mounted on shaft 16 of a high-speed drill motor that is capable of rotation speeds up to 48,000 r.p.m. Mirror 14 is arbitrarily selected to be the laser output coupling mirror. During operation, rotation of shaft 16 brings hole 18 into alignment with lamp 22 and light detector 24 (a photovoltaic silicon solar cell) allowing light from lamp 22 to activate detector 24. A voltage pulse of detector 24 is supplied as an input to an oscilloscope-delay network 26. The signal applied to oscilloscope 26 is displayed on the scope and passed through the variable delay circuit therein before being applied as a positive pulse to input terminal 45 of pulser 32. The input trigger signal is coupled through C1 to the grid of V/, overcoming a negative bias thereon and driving V1 into conduction. Discharge currents from C2 and C3 develop a voltage across R2 that is cathode coupled through R3 to the grid of V2. V2 is activated by the input thereto and the resultant signal is again cathode coupled through the series connected capacitor and resistor to the grid of V3, thus triggering V3. Capacitor C5, previously charged by power source B+++, discharges through V3 and through the firing circuit AC of ignitron V4. Ignitron V4 is the pulser power stage and serves as a switch for storage capacitor C6. Prior to each switching pulse, C6 is charged through R9 by power supply 28 as is the case for each plate to ground capacitor for all stages.

When V4 conducts, C6 is switched across R11 and laser 10, discharging through the laser and the low resistance. During charging of C6, the negative side thereof is clamped to ground through low resistance R10 and C6 charges through R10. This resistance is chosen to be small in comparison to the laser tube impedance prior to discharge, but large compared with the laser impedance after it has fired. Resistor R11 is smaller than R10 by approximately two orders of magnitude After C6 is charged V4 fires, grounding the positive side of C6, which places the capacitor potential across laser 10 and R11. Breakdown of the laser gas presents a very low discharge path when compared with R10 and takes the major portion of the energy therethrough. This discharge circuit for C6 provides a ground path for the igniter circuit of V4 and yet allows one side of the laser tube to remain at ground potential.

First stage tube V1 conducts only in response to each positive input pulse, coupling the periodic trigger signal to V2. Tube V1 can be a vacuum triode or a gas-filled thyratron. The bias voltage for V1 is adjusted in accordance with adjustments in the system delay circuit to maintain the bias at a level that can be overcome by any adjusted input signal level. When triggered, thyratrons V2 and V3 conduct until the voltage thereacross cannot sustain conduction therethrough. When conduction through V2 and V3 ceases, the associated plate-to-ground capacitors begin recharging. Ignitor V4 circuitry follows a similar recharge cycle. Due to the speed of circuit operation (shaft 16 rotation being capable of speeds up to 48,000 r.p.m. plate capacitors are not charged to the exact voltage supplied thereto but rapidly attain a voltage sufficient to sustain brief and sufficient discharge currents through the tubes when the grid trigger pulses are received.

The primary adjustment of the delay time between pumping and Q-switching is through the electrical delay circuits. These circuits have a very large operating range—from microseconds to seconds. Alternately, laser 10 firing time can be varied by varying shaft rotation speed. Indicative of the delay time between exciting or pumping the laser and Q-switching the output mirror, the angle $\theta$ can be adjusted by positioning output mirror 14 in a plane closer to or farther from the axis of hole 18. This allows less or more time for self-stimulation of the laser after the electric discharge therethrough. A vernier adjustment to the course angle $\theta$ adjustment is obviously provided by delay network 26 (oscilloscope) wherein the angle $\theta$ adjustment allows the general range of population inversion level to be attained and delay network 26 coupled with the minute inherent delay of pulser 32 allows finer control of attaining the desired population inversion just before Q-switching occurs. A high peak power output energy pulse is thus attained from laser 10 as rapidly as the overall system response permits.

I claim:

1. A high peak power laser for producing a high frequency pulsed output and comprising: a gas laser medium; first and second reflecting mirrors at opposite ends of said laser medium; said first mirror being rotatable for providing alternate periods of resonance and nonresonance of an optical cavity formed in said laser medium; pumping means for providing excitation of said laser medium during said nonresonant period, said pumping means including a pulser network for triggering said pumping excitation; adjustable control means for preselecting a variable time between onset of said pumping excitation during said nonresonant periods and laser output energy pulses obtained during said resonant periods, said adjustable control means including a light source, a detector responsive to light from said light source to generate an electrical output pulse during said nonresonant periods, and a delay network connected between said detector output and said pumping means; a rotatable shaft for controlling the rotation speed of said first mirror, said first mirror being adjustably attached to the end of said shaft and being paralleled with said second mirror once during each half cycle of shaft rotation for periodically providing a resonant cavity between said mirrors; first and second electrodes at opposite ends of said gas laser medium and in contact therewith for providing electrical discharge therethrough and stimulating population inversion of energy levels therein; and said pulser network including at least a power source, an input stage, and output stage and a capacitive discharge circuit; said input stage having a three element electron device connected respectively to said power source, a system ground, and a delayed output from said delay network; said delayed output being coupled to said third element or electrode by a coupling capacitor, and an output signal from said second electrode being coupled to said output stage; said output stage including a high-voltage switch having first, second and third electrodes, said first or trigger electrode being coupled to said first stage output signal, said second electrode being coupled to said power source and said third electrode being connected to ground; and said capacitive circuit including a capacitor and first sand second resistors, said capacitor having one side connected to said power source and the other side connected through said first resistor to ground and through said second resistor to said first electrode of said laser medium, said second laser electrode being connected to ground for providing a discharge path therethrough.

2. A high-power laser as set forth in claim 1 wherein said delay network is in the input circuit of an oscilloscope for displaying the photocell output pulse prior to activating the first stage of said pulser network, and said input stage electron device is a vacuum triode and said switch is an ignition.